Aug. 27, 1935.  P. ROBINSON  2,012,481
ELECTROLYTIC CONDENSER
Filed Aug. 1, 1931
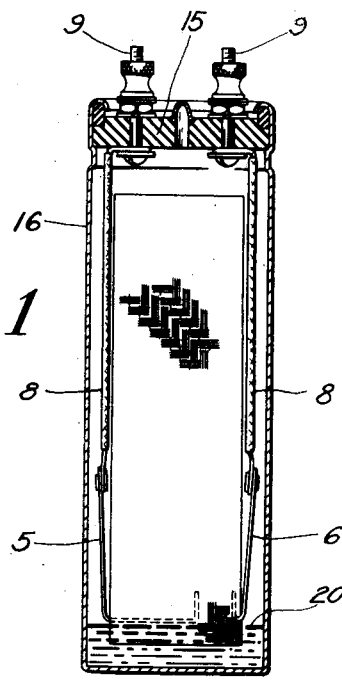
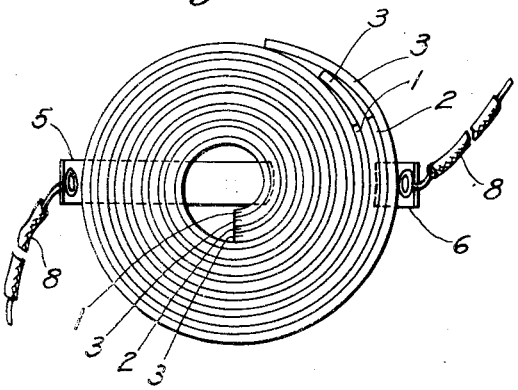
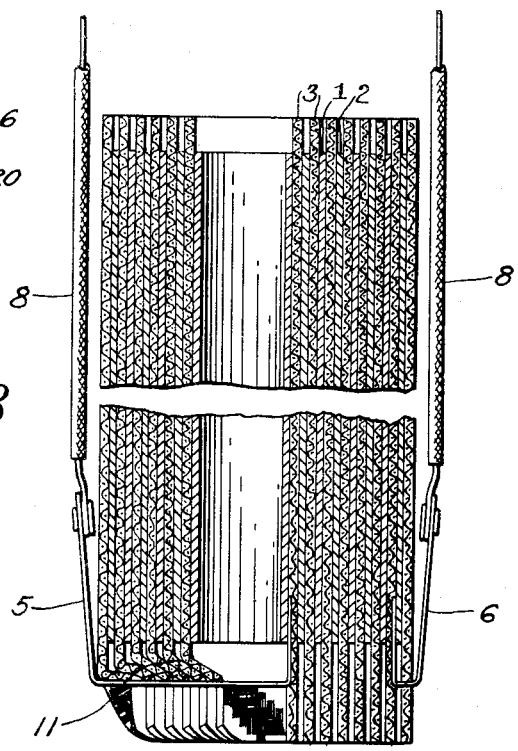
Preston Robinson
INVENTOR.
BY Dorsey & Cole
ATTORNEYS.

Patented Aug. 27, 1935

2,012,481

UNITED STATES PATENT OFFICE 2,012,481

ELECTROLYTIC CONDENSER

Preston Robinson, North Adams, Mass., assignor to Sprague Specialties Co., North Adams, Mass., a corporation of Massachusetts Application August 1, 1931, Serial No. 554,536

8 Claims. (Cl. 175—315)

My invention relates to electrolytic devices and more particularly to electrolytic condensers having electrodes of aluminum or other film-forming metal.

Condensers of the above type are well-known in the art and have been made with electrolytes having various consistencies, as liquid, semi-liquid, paste, semi-solid and substantially solid electrolytes. Condensers of the fully liquid type in which an excess of aqueous solution of a salt or acid is present and which are referred to as a rule as wet electrolytic condensers have given so far the most satisfactory results. However, they have the disadvantage of excess volume and weight, the possibility of leakage, require vertical mounting and are subject to freezing at low temperatures. Various endeavors have been made to overcome these objections by reducing the amount of liquid and using viscous or pasty electrolytes.

The electrolytes used in electrolytic condensers comprise as a rule salts, acids or alkalies and a solvent. Preferably, a combination of a weak acid and a salt is used, for instance, electrolytes comprising borax and boric acid are well suited. However, other acids and salts may be used with good success, for instance, phosphoric acid, citric acid, tartaric acid and their salts, whereby the salts do not need to be that of the acid used in the electrolyte.

In the endeavor to reduce the amount of liquid in the electrolyte, it has been proposed to eliminate altogether water as a solvent and use glycerin and viscous alcohols as the solvent. However, the condensers so far manufactured have various drawbacks which I have found to be due primarily to the following reasons:

In an electrolyte comprising salts, acids or alkalies—hereafter referred to as salts—and a solvent, the salt and the solvent itself are essentially non-conductors and the sole vehicle for electric conduction is that portion of the salt which is dissolved in and ionized by the solvent.

The resistance and life of an electrolytic condenser are thereby determined by the amount of ionized salt and the loss of solvent during operation. Such loss of solvent on the other hand depends on the internal resistance of the condenser, because increased resistance increases the power factor and the heating up of the condenser and causes evaporation of the solvent. Besides this, high internal resistance and high power are objectionable for electrical reasons.

Thus to produce a satisfactory condenser, sufficient amount of ionizing solvent is to be provided and at the same time the internal resistance of the electrolyte is to be kept as low as possible.

However, as has been pointed out in my copending application Ser. No. 548,270, filed July 1, 1931, glycerine and alcohol proposed as solvents for non-liquid electrolytes are much inferior as ionizing solvents than water. Assumed, the same concentration of salt for different solvents, the ionization and thus the conductivity of the electrolyte is dependent upon the dielectric constant of the solvent and is proportionate to the cube of the dielectric constant of the solvent. The dielectric constants for water, glycerine and alcohol (at room temperatures) are approximately 81, 39, and 25 respectively, and thus the ionization obtained for water, glycerine and alcohol will be in the approximate proportions of 512, 59, and 15.6. The conductivity obtainable with water is therefore about eight times as great as with glycerine and about thirty-two times as great as with alcohol.

From this, it also appears that a much smaller amount of water is required for satisfactory operation and given life of the condenser than would be required if other ionizing solvents were used.

At the same time, in the case of a solvent like glycerine and alcohol, the ionization being limited, the excess of the undissolved solid or excess of solvent serve no useful purpose.

The purpose of my present invention is, therefore, to provide a condenser with an electrolyte in which water is the only or prime ionizing solvent and at the same time a minimum amount of ionizing solvent is provided for the proper operation and proper life of the condenser.

I shall discuss my invention on hand of a specific embodiment.

In the drawing which forms part of this specification, Figure 1 is a side elevation, partly in section, of a condenser embodying my invention as assembled in a container.

Fig. 2 is an enlarged cross-section of the condenser proper, shown in Fig. 1.

Fig. 3 is an enlarged side elevation, partly in section, of the condenser.

The condenser consists of two metal foils, 1 and 2, one or both of which may be of aluminum or other filmed metal and preferably wound in the form of a cylinder. Two spacers 3—3 are provided between the metal foils 1 and 2, and metal strips 5 and 6 are attached by means of rivet connections or in other suitable way to the foils 1 and 2 respectively, the other ends of the strips 5 and 6 are connected with eyelets or in other suitable way to leads 8—8. The condenser is surrounded by a container 16, open at one end, a cover 15 of insulating material closes the container, and proper sealing means are provided between the cover and the container. The cover 15 carries terminals 9—9 to which the free ends of the leads 8—8 are connected, whereby the condenser, if desired, may be suspended from the cover 15 by means of the leads.

The spacer 3 is preferably made of fibers, of highly absorptive properties, preferably treated to free them from grease and other hydrophobic material, which may decrease the absorptive properties of the fiber. The fiber of the spacer is preferably woven in a basket weave or other weave which enhances the capillary action of the fibers. Its construction and, as will be seen, its function, is quite similar to that of a wick used in an oil lamp.

The wick-like spacer 3 acts as a carrier for the electrolyte which it absorbs and equalizes throughout the condenser, so that if at any point in the condenser for some reason or other the electrolyte has a tendency to be lost, the wick supplies fresh electrolyte to these points.

Thereby, I impregnate, or otherwise, provide the wick with a sufficient amount of electrolyte which, through the above described action of the spacer, is uniformly distributed in the condenser. As the capacity of the condenser among others depends on the area of the electrodes which are directly contacting with the electrolyte, it will appear that local vaporization of the electrolyte which generally greatly affects present type viscous or dry electrolyte condensers, will not reduce the capacity of my condensers, as the spacer supplies almost instantaneously a sufficient amount of new electrolyte to the depleted place.

To provide an excess amount of electrolyte between the foils, the thickness of the fiber spacers might be increased. However, such increase in thickness is undesirable as it increases the series resistance of the condenser. To provide for such an excess of electrolyte, I may provide a small reservoir indicated in Fig. 1 as an excess of electrolyte 20 in the bottom of the container 16, whereby the wick extends from between the plates 1 and 2 to immerge in the reservoir.

In this manner, a defined amount of excess electrolyte can easily be provided to prolong the life of the condenser to any desired length of time. It should be noted that neither the electrolyte originally provided in the spacer nor the electrolyte in the reservoir needs to be highly fluid, as with highly absorptive spacers satisfactory equalization of even highly viscous electrolytes can be obtained.

It should be also noted as fully set forth in my above referred to application, that the electrolyte, even if water is the main ionizing solvent, can be made highly viscous by addition of inert substances, without substantially influencing the resistance of the electrolyte and the electric properties of the condenser.

Thereby in the construction as shown in drawing, a portion 11 of the spacer is interposed between the end of the condenser and the strips 5 and 6 thereby preventing short circuits between such strips and the foils of opposite polarities.

Instead of providing a wick-like spacer and relying on the absorptive power of the fiber, I may provide a spacer which is not particularly absorbent or not absorbent at all and even may be sized with rosin, soap or starch and provide another absorbing material to act as a carrier for the electrolyte. Such an additional absorbent may be, for instance, silica-gel or aluminum oxide-gel. Such gel in the form of a fine powder absorbs large quantities of the electrolyte and acts in a similar way as a wick.

By using such absorbent, a thin and mobile liquid electrolyte may be used which will cover the effective parts of the condenser quite readily and yet not drain away from the effective portion of the condenser but cover all of the effective parts of the condenser uniformly and be held by absorbing material in the proper position.

This equalizing ability of the absorbent has the further advantage that any local change due to vaporization of the liquids or condensation of moisture will be overcome rapidly by the absorbent, either by supplying fresh liquid to the spots dried out by vaporization or by re-absorbing and distributing the condensed moisture.

I am aware that in the past condensers have been suggested using paste or mush-like electrolytes by dissolving salts in an ionizing solvent and adding to the solution an excess of solid salt. The solid salt in such condensers is not a conductor of electricity as dry salts, even those containing water of crystallization in large amount, are very poor conductors of electricity. Thus in the electrolytes of prior art the large mass of material was non-conductive and a large proportion of this paste between the electrodes was taken up with inert solid material with no absorbing qualities, whereby the amount of effective electrolyte in the condenser was quite small, the resistance of the electrolyte high and the life of the condenser short.

A serious disadvantage of the electrolytes used in the prior art is their instability at higher temperature. While these electrolytes at low temperatures are apparently quite rigid and stay between the electrodes, at higher temperatures due to the greater solubility of the solid ingredients at such temperatures, the paste becomes quite fluid and may flow from between the plates of the condenser. This is particularly true when the condenser is operated at high temperatures because then the liberation of gas at the electrodes materially assists the flow of electrolyte from between the plates causing serious decrease in capacity and increase in resistance.

In condensers embodying my invention, the actual proportion of electrolyte may be quite small—nevertheless the actual amount held between the electrodes is nearly as much as would be the case if the condensers were entirely immersed in liquid electrolyte.

Another advantage of my electrolyte is its stability towards temperature. Since the solid portion of the electrolyte is essentially insoluble in the liquid portion at all temperatures, the only effect of an increase in temperature is a slight increase in fluidity of the liquid portion of the electrolyte, which is, however, insufficient to affect its resistance to plastic flow.

While in case of salts, such as borax when dissolved in ionizing solvents as water, alcohol, ethylene glycol, hydrophyllic absorbents as silica-gel or aluminum hydroxide-gel are especially well suited, in other cases substances as starch, charcoal, burnt clay, etc., might be preferable absorbents.

In any event, I prefer to proportion the electrolytes and the absorbent in such a way that the electrolyte is largely absorbed in the absorbent, rather than the absorbent dispersed in the electrolyte. At the same time, I prefer to use water as the prime ionizing solvent.

While I have disclosed my invention in connection with specific devices and given specific examples embodying same, I do not wish to be limited to such devices and examples, but desire the appended claims to be construed as broad as permissible in view of the prior art.

What I now claim and desire to secure by Letters Patent is:

1. An electrolytic condenser comprising electrodes and a highly absorptive spacer interposed between said electrodes and a highly viscous electrolyte, said spacer constituting a carrier for the equalized distribution of the electrolyte in the interspace between the electrodes during the operation of the condenser.

2. An electrolytic condenser comprising closely spaced electrodes and a wick-like spacer interposed between said electrodes, a viscous electrolyte retained in said spacer and uniformly distributed between said electrodes during the operation of the condenser.

3. An electrolytic condenser comprising closely spaced electrodes and a low fluidity aqueous electrolyte, retained in said spacer, said spacer distributing uniformly during operation said electrolyte over the entire surfaces of the electrodes.

4. An electrolytic condenser comprising two electrodes and a basket-weave absorptive spacer interposed between same and projecting beyond the electrodes, a low fluidity electrolyte retained in said spacer and a supply of electrolyte, said spacer immerging with its projecting portion into the supply of electrolyte.

5. In an electrolytic condenser, closely spaced electrodes and a hydroscopic absorbent freed from all hydrophobic matter, sandwiched between said electrodes and an electrolyte of considerable fluidity absorbed by said absorbent and retained with equal distribution between said electrodes.

6. An electrolytic condenser comprising a condenser roll comprising two electrodes and an electrolyte-carrying spacer interposed between same, said spacer having a portion extending beyond the electrodes on one end of the roll, a terminal lead connected to one of said electrodes at that end of the roll at which the spacer extends, said lead having a bent portion which presses against said extending spacer portion and causes the latter to form a substantially uninterrupted insulating layer interposed between the said end of the roll and said bent lead portion.

7. An electrolytic condenser comprising electrodes, a spacer interposed between said electrodes, a highly viscous electrolyte partly carried by said spacer and partly being disposed as additional electrolyte outside the interspace between the electrodes, said spacer immerging in the additional electrolyte and serving for the equalized distribution of the electrolyte during the operation of the condenser.

8. An electrolytic condenser comprising closely-spaced electrodes, and a highly absorptive fiber spacer interposed between said electrodes, a viscous electrolyte comprising a weak acid, a salt of a weak acid and a viscous alcohol, said spacer constituting a carrier for the equalized distribution of the electrolyte in the interspace between the electrodes during the operation of the condenser.

PRESTON ROBINSON.